UNITED STATES PATENT OFFICE.

WILLIAM TURNER, OF PHŒNIXVILLE, PENNSYLVANIA, ASSIGNOR TO JOSEPH Y. NORTON AND J. PHILIPS, OF SAME PLACE.

LUBRICATING COMPOUND.

Specification forming part of Letters Patent No. 31,519, dated February 19, 1861.

*To all whom it may concern:*

Be it known that I, WILLIAM TURNER, of the borough of Phœnixville, county of Chester, and State of Pennsylvania, have invented a new and useful Lubricating Compound, for lubricating machinery and lessening the friction and wear of rubbing-surfaces; and I do hereby declare that the following is a full and exact description thereof, reference being had to the accompanying specimens of ingredients and of the said lubricating compound.

The nature of my invention consists in the use of a compound of sperm, lard, or elephant oil, water, and the chloride of lime and bicarbonate of soda, which forms a lubricator of great cheapness, durability, and perfection, and which will not, by use, gum on the rubbing-surfaces.

To enable others skilled in the art to make use of my invention, I will proceed to describe the ingredients used and the method of their combination.

To make six gallons of the lubricating compound, I take of chloride of lime, one pound; bicarbonate of soda, one ounce; boiling water, pure, three gallons; elephant, lard, or sperm oil, three gallons. I mix the chloride of lime and bicarbonate of soda in the boiling water until they are dissolved, and then add the oil and stir the whole together until the ingredients are perfectly incorporated, when the compound will be ready for use.

The quantity of oil above prescribed is the maximum quantity. If the oil be pure, a less amount is required.

What I claim in my invention, and desire to secure by Letters Patent, is—

The use of this compound for lubricating purposes.

WILLIAM TURNER.

Witnesses:
 LAVINGTON QUICK,
 W. ALLAN PECK.